United States Patent [19]

Petisce

[11] Patent Number: 5,074,643
[45] Date of Patent: Dec. 24, 1991

[54] ARTICLE COMPRISING A NONPIGMENTED CURED COLOR COATING

[75] Inventor: James R. Petisce, Norcross, Ga.

[73] Assignee: AT&T Bell Laboratories, Murray Hill, N.J.

[21] Appl. No.: 450,710

[22] Filed: Dec. 13, 1989

[51] Int. Cl.⁵ .............................................. G02B 6/16
[52] U.S. Cl. ................................... 385/128; 385/141
[58] Field of Search ............... 350/96.29, 96.30, 96.31, 350/96.32, 96.33, 96.34; 71/30

[56] References Cited

U.S. PATENT DOCUMENTS

| | | | |
|---|---|---|---|
| 3,157,633 | 11/1964 | Kuhn | 534/29 |
| 4,219,348 | 8/1980 | Parham, Jr. et al. | 71/30 |
| 4,407,561 | 10/1983 | Wysocki | 350/96.3 |
| 4,629,286 | 12/1986 | Fuse et al. | 350/96.23 |
| 4,828,349 | 5/1989 | Nakasuji | 350/96.33 |
| 4,900,126 | 2/1990 | Jackson et al. | 350/96.23 |
| 4,919,513 | 4/1990 | Nakakuki et al. | 350/96.33 |

FOREIGN PATENT DOCUMENTS 1578807 7/1969 France.
1-022976 1/1989 Japan.

Primary Examiner—John D. Lee
Assistant Examiner—Phan T. Heartney
Attorney, Agent, or Firm—Edward Somers

[57] ABSTRACT

An optical fiber (20) which includes at least one coating layer is provided with a color identification system which is nonpigmented. In a preferred embodiment, the optical fiber includes two layers (26,28) of coating materials. Applied over the outer one (28) of the two coating layers is a color identification layer (30). The color identification layer may comprise an oligomeric composition of matter and a polymeric dye. For those instances when relatively high hiding power is required, such as when optical fiber has been provided with a hermetic coating, the color identification system also includes an opacifier. In an alternative embodiment, the outer or secondary coating layer is a composition of matter which comprises the opacifier and the polymeric dye.

23 Claims, 1 Drawing Sheet

ARTICLE COMPRISING A NONPIGMENTED CURED COLOR COATING

TECHNICAL FIELD

This invention relates to an article comprising a nonpigmented cured color coating. More particularly, the invention relates to a nonpigmented ultraviolet light cured color coating for optical fiber.

BACKGROUND OF THE INVENTION

Optical fiber has been well established as a reliable transmission medium. For many uses, a plurality of optical fibers are assembled together protected by sheath components to form a cable structure. Typically, a plurality of optical fibers are assembled in a bundle and one or more bundles are used to form a unit. Alternatively, a cable may include a core which comprises a plurality of optical fiber ribbons, each ribbon including a plurality of optical fibers, arrayed in parallel relationship to each other with the longitudinal axes of the fibers disposed in a plane. Typically, an optical fiber comprises a core and a cladding and one or more coatings.

During a process of manufacturing a glass optical fiber, a glass fiber is drawn from a preform and then coated with one or more coating materials, typically, ultraviolet light curable materials. The coating materials include, for example, polymeric compositions and are applied by one or more coating applicators. The function of the fiber coating is to protect the surface of the glass optical fiber from mechanical scratches and abrasions which the optical fiber may experience during subsequent handling and use. The coating or coatings also influence the fiber's optical characteristics in response to external mechanical forces and environmental temperature.

In a cable, for example, optical fibers are identified from one another by the use of a color coating layer which has been applied to the coated optical fiber. In the past, desired colors have been obtained in commercially available color coatings by using a dispersion of colored pigment particles in a suitable liquid carrier.

The use of pigmented materials to provide color coatings for optical fiber has presented manufacturing and performance problems. For example, pigment particles dispersed in an organic binder resin, as in all physical mixtures, gradually will separate into two distinct phases. As a result, pigmented color coatings have a relatively short shelf life.

The occurrence of phase separation in a pigmented colorant system is complicated by the concurrent agglomeration of pigment particles. Undesirably, the presence of agglomerates of pigment particles in a color coating on a coated optical fiber can induce microbending which results in transmission losses.

Further, the relatively high concentration of pigment material which is required to achieve an opaque ultraviolet light curable color coating inhibits the transmission of incident light which is necessary to cure the color coating material. The pigment constituent refracts, reflects and scatters light from the curing source thereby making it difficult to cure the coating material. This results in a reduction in processing speed of the optical fiber along a manufacturing line and thereby increases production costs. The inherently slow cure speed of pigmented color coatings causes the processing and the cure of these materials to be sensitive to minor changes in the thickness of the color coatings.

An additional drawback to the use of pigmented materials is that some pigments include heavy metals such as lead or cadmium. The use of such constituents in a color coating for optical fiber presents a safety question. Additionally, the use of optical fiber color coated with such pigmented systems in above-ground, outside plant may be deleterious to the environment.

Because of these disadvantages of pigment-based color identification systems, thought has been given to using dyes. However, there is a problem associated with the use of dyes, and this problem relates to some of the coating materials used on optical fibers. Polymeric coatings are effective to prevent mechanical damage to the glass fiber surface they are meant to protect; however, diffusion of water vapor, hydroxyl ions, and hydrogen through the polymeric coatings pose additional threats to the strength, mechanical integrity and optical performance of the optical fiber.

Mechanical failure of the optical fiber may occur through a glass fiber failure mechanism referred to as stress corrosion. In an outer surface of a glass body, there exist surface imperfections resulting from mechanical damage or flawed silica bonds, for example. These imperfections, which are called microcracks, act as stress concentrators and thus may cause failure to occur preferentially at these locations when the fiber is subjected to tensile stresses. As stress is increased to a certain critical level, the fiber will fail at the crack site. Normally, these cracks will not grow under the influence of stress alone. In the presence of contaminates, hydroxyl ions, for example, the source of which may be water vapor, these cracks tend to grow at predictable rates when subjected to tensile loading. This stress corrosion is the result of the incorporation of the hydroxyl ions into the silica matrix of the optical fiber. Fiber failure may occur at stress levels significantly below an otherwise higher level due to the fact that the microcracks slowly but steadily reduce the area over which the tensile loads are resisted.

The presence of hydrogen adjacent to the optical fiber can also result in the diffusion of hydrogen through the polymer coatings and into the fiber core. Hydrogen which has diffused into the core of the fiber may react with core glass matrix defects, the effect of which is increased optical loss in the fiber.

Stress corrosion and hydrogen absorption can be prevented or at least reduced to a significant degree by the application of a hermetic coating to the fiber surface after fiber drawing but before any polymeric coatings are applied to the fiber surface by a variety of methods. For example, J. A. Wysocki U.S. Pat. No. 4,407,561 discloses that a variety of metals, including nickel, copper and aluminum may be used to provide a hermetic coating for a glass optical fiber. The hermetic coating is applied by passing a just-drawn optical fiber through a molten pool of metal. It is now common practice to apply a hermetic coating which includes carbon.

The problem is that these hermetic coatings typically exhibit a dark color which is difficult to hide. Conventional dyes and pigmented systems, it has been found, are unable to cover satisfactorily hermetic coating materials and still provide desired performance characteristics.

What is needed and what does not seem to be available in the prior art is a nonpigmented color coating system which may be used for optical fiber. The sought after system must be reasonably low in cost and must be capable of being applied to optical fiber along existing optical fiber manufacturing lines without necessitating any reduction in processing speed. Of course, the desired color coating system must be acceptable environmentally and must not present potential problems in handling.

SUMMARY OF THE INVENTION

The foregoing problems of the prior art have been overcome with the color coating system of this invention. An article having a nonpigmented, opaque color identification system includes a substrate such as drawn optical fiber and a color identification system which has been applied to the substrate. The color identification system comprises an ultraviolet light curable coating composition which has suitable adhesion to the substrate. Also included in the color identification system is a polymeric dye.

In one embodiment where relatively high hiding power is required, the color identification system also includes an opacifying agent. The ultraviolet light curable coating material has sufficient aromaticity to render its refraction index sufficiently high so that a mixture comprising the ultraviolet light curable coating and the opacifying agent yields a white opaque liquid.

Advantageously, the color identification system may be included in the optical fiber in several forms. For example, the optical fiber which includes a core and a cladding and one or more coating materials may have a color coating layer applied to the outer one of the coatings. Alternatively, the color identification system may be included in the outer one of the optical fiber coatings.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
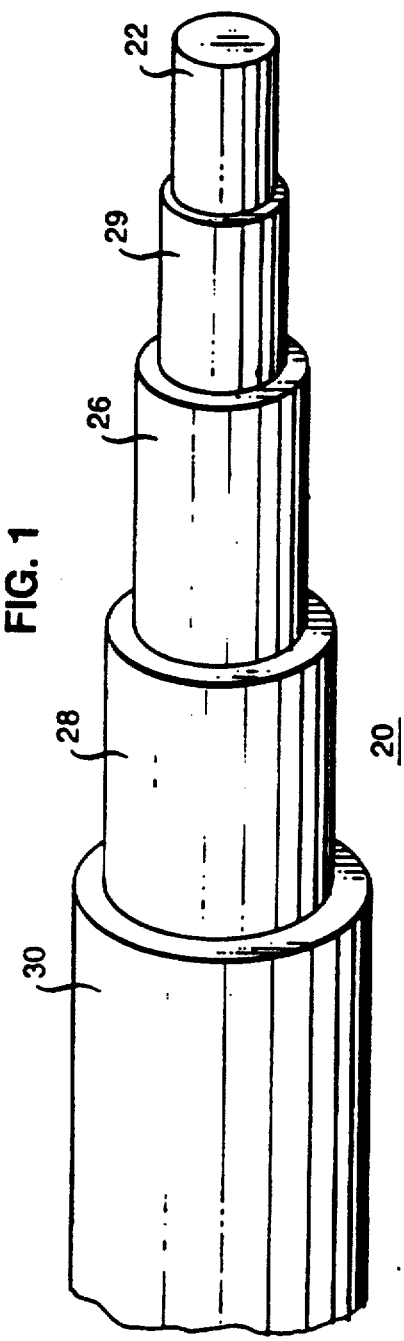
FIG. 1 is a perspective view of a substrate in the form of an optical fiber having a color coating layer applied thereto.
Figure 2:
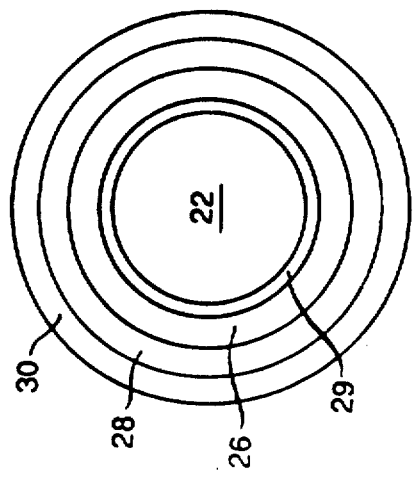
FIG. 2 is an end view of the optical fiber of FIG. 1.

Referring now to FIGS. 1 and 2, there is shown an optical fiber which is designated generally by the numeral 20. The optical fiber 20 typically includes a glass fiber portion 22 comprising a glass core and a glass cladding. As is conventional in the art, the glass core and glass cladding are protected by a coating system. Typically, the coating system includes two layers of polymeric coating materials. An inner layer 26 is referred to as a primary coating layer and is relatively soft to cushion the glassy portions. Enclosing the primary coating layer is an outer coating layer 28 which is referred to as a secondary coating layer.

In some optical fiber such as the one depicted in FIGS. 1 and 2, a layer 29 of a hermetic coating material is interposed between the inner coating layer 26 and the glass fiber 22. The hermetic coating material is used to prevent moisture from reaching the glass fiber 22.

In order to be able to identify optical fibers when a plurality of them are assembled into a cable, it becomes necessary to provide each optical fiber with a color identification system. Desirably, this task is performed by the manufacturer of optical fiber, otherwise the coloring would have to be done by the cabler.

The color identification system of this invention is founded on the use of a polymeric colorant as opposed to prior art pigment-based systems. The nonpigmented color coatings includes polymeric colorants which comprise macromolecular chromophore-containing molecules where an organic dye unit is linked chemically to a polymer chain. Hereinafter, this chemical constituent is referred to as a polymeric dye.

Polymeric dyes are disclosed in U.S. Pat. No. 3,157,633 which is incorporated by reference hereinto. The polymeric dye is of an oligomeric nature, specifically one in which dye molecules are attached to long chain material. The use of a polymeric dye in an optical fiber color coating causes it to be entrapped in a crosslinked network. The result is stability which is enhanced over that of a conventional dye. For example, in the past, it was not uncommon for a conventional dye to be exuded out into a cable filling material. The problems discussed hereinbefore are avoided with a color identification system which uses a color coating including polymeric colorants which are macromolecular chromophore-containing molecules wherein an organic dye exist is linked chemically to a polymer chain.

Inasmuch as a polymeric colorant-based optical fiber color coating is translucent, the color identification system also includes a relatively low refractive index opacifying material. The latter material when included in the colorant-based color coating renders the composition opaque before and after cure. The refractive index of the opacifier is low relative to other components in the color coating composition. When blending constituents which have a relatively large difference in index of refraction, the resultant mixture appears white to the human eye. To this base is added a polymeric dye to impart color to the formulation. A non-polymeric dye could be used to provide the coloring, but it does not have the stability provided by the polymeric dye.

The color identification system may be included in several ways. In a preferred embodiment which is depicted in FIG. 1, the color identification system is included as a layer 30 which is applied about the outer secondary coating layer 28. In such a structure, the outer diameter of the cladding is about 125 microns, and of the outer coating layer 28 is about 250 microns. The thickness of the color identification layer is in the range from about two to thirty-five microns.

In the preferred embodiment, the color identification layer 30 is a composition of matter which comprises a cured composition of matter, an opacifier and the polymeric dye. The cured composition of matter may be one which is ultraviolet light cured, visible light cured or thermally cured.

In a preferred composition, the color identification layer 30 when applied is a composition of matter which comprise an ultraviolet light curable oligomeric composition of matter, an opacifier and a polymeric dye. Preferably, the composition comprises about 98 percent by weight of the oligomeric composition of matter, about 1 percent by weight of the opacifier and about two percent by weight of the polymeric dye.

The oligomeric composition may be one which is well described in the literature. For example, it may comprise about 75 percent by weight of an oligomer, about 23 percent by weight of a diluent and about 2 percent by weight of a photoinitiator. More specifically, in one ultraviolet light curable oligomeric composition of matter the oligomer may comprise polyethylene glycol adipate-toluene diisocyanate-hydroxyethyl acrylate. The diluent may comprise about 11.5 percent by weight of N-vinyl pyrrolidone and about 11.5 percent by weight of ethoxyethoxyethyl acrylate. The photoinitiator maybe one which is marketed by the Ciba Geigy Company under the tradename Irgacure 651.

In the foregoing composition, the oligomeric constituent is relatively viscous and in fact may not flow as desired at room temperature. The diluent constituents function to reduce the viscosity of the oligomer and cause it to be processable at room temperature.

The subcombination of the ultraviolet light curable oligomeric material and the opacifier provide a white, opaque composition. The addition of the polymeric dye to the subcombination composition comprising the ultraviolet light curable oligomer and the opacifier provides the desired color coating composition.

The thickness of the layer 30 may vary from that regarded as conventional for a color coating. Generally, the thickness of the color identification layer has been about two microns. In the color identification system of this invention, as mentioned hereinbefore, the thickness may be as much as about 35 microns. A layer of such thickness effectively acts as a well known buffer layer used to enclose coated optical fiber. As such, it serves three functions. First, it provides robustness for the coated optical fiber, secondly, it provides microbending resistance; and thirdly, it provides color identification.

Figure 3:
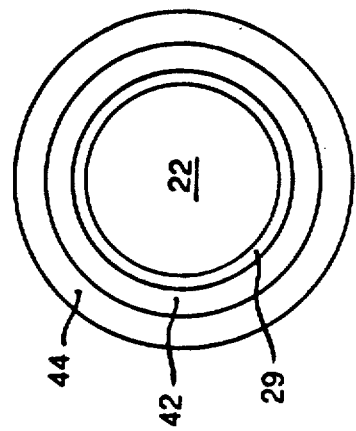
FIG. 3 is an end view of another embodiment of an optical fiber having color identification means.

Depicted in FIG. 3 is an alternative embodiment to the one shown in FIGS. 1 and 2. In FIG. 3, the glass fiber 22 and the hermetic coating layer 29 are enclosed in two coating layers. The first or inner coating layer 42 is the primary coating layer and may be identical to the primary coating layer 26 of FIGS. 1 and 2.

An outer or secondary coating layer 44 of FIG. 3 comprises a coating material which is a curable composition of matter and which is characterized by substantially the same properties as those of the secondary coating layer of FIGS. 1 and 2. However, in this instance, the secondary coating layer which may comprise an oligomeric material also includes an opacifier and a polymeric dye.

In a preferred embodiment of the optical fiber of FIG. 3, the secondary coating comprises about 98 parts by weight of an ultraviolet light curable coating constituent, about one part by weight of an opacifier and about two parts by weight of a polymeric dye.

The composition of the secondary coating is provided first by preparing a premixture comprising 99 parts by weight of an untraviolet light curable constituent such as, for example Desolite ® 950-101 coating material available commercially from the DeSoto Company of Des Plaines, Ill. Added to the light curable constituent to provide the premixture is 1 part by weight of an opacifier such as a perfluorinated polyether having a refractive index which is substantially less than the refractive index of the secondary coating composition. Such an opacifier is available commercially from the Ausimont Company of Morristown, N.J. under the trade description Z-Dol.

To 98 parts by weight of the premixture is added two parts by weight of a polymeric dye of a desired color. Such a polymeric dye is available commerically from the Milliken Company of Spartanburg, S.C.

Further, in the preferred embodiment, the ultraviolet light curable constituent of the secondary coating comprises about 75 percent by weight of an oligomer, 23 percent by weight of diluent, and about two percent by weight of a photoinitiator.

The embodiment of FIGS. 1 and 2 is preferred. With that arrangement, the color identification system may be added off-line. As a result, the properties of the drawn optical fiber may be determined prior to the selection of the color to be associated with fiber having particular properties.

The nonpigmented color coating has several advantages. It has the ability to hide any hermetic coating, it is stable, and it does not affect performance characteristics of the fiber. Further, it is less expensive than those used in the past. Whereas in the prior art, pigmented formulations typically included about thirty to forty weight percent of the pigment constituent, the coating compositions of this invention includes in the range of about two weight percent of polymeric dye.

The color identification system thus far described is suitable for coloring optical fiber which includes a hermetic coating layer. It will be recalled that a hermetic coating generally includes a carbon constituent which exhibits a black appearance. Any color identification system needs opacity to hide the underlying black color and to provide the desired color on the fiber. Accordingly, a color identification system which is used to color identify a hermetically coated optical fiber requires an opacifier.

On the other hand, optical fiber which does not include a hermetic coating generally appears silver in color. As a result, the color identification system for providing a desired color need not require an opacifier, rather only a light curable coating composition and a polymeric dye.

In preparing a composition of this invention which does not include an opacifier, the admixture step is bypassed. A commercially available material such as the earlier mentioned Desolite material in parts by weight of about 98 is mixed with about two parts by weight of a polymeric dye of the desired color. The mixture may be applied to an outer surface of a secondary coating as depicted in FIG. 1 or may itself comprise the secondary coating for the optical fiber.

It is to be understood that the above described arrangements are simply illustrative of the invention. Other arrangements may be devised by those skilled in the art which will embody the principles of the invention and fall within the spirit and scope thereof.

I claim:

1. An elongated communication transmission medium having a color identification system, said elongated communication transmission medium comprising:
    a substrate which comprises an elongated communication transmission medium; and
    a coating system which has been applied to said substrate, said coating system comprising:
        a cured coating composition; and
        a color identifier which includes a polymeric dye.

2. The elongated communication transmission medium of claim 1, wherein said polymeric dye comprises macromolecular chromophore containing molecules wherein an organic dye unit is linked chemically to a polymer chain.

3. The elongated communication transmission medium of claim 2, wherein said cured coating composition is radiation cured.

4. The elongated communication transmission medium of claim 3, wherein said cured coating composition is one which has been cured by visible light radiation.

5. The elongated communication transmission medium of claim 3, wherein said cured coating composition has been thermally cured.

6. The elongated communication transmission medium of claim 3, wherein said cured coating composition is one which is cured by ultraviolet light.

7. The elongated communication transmission medium of claim 6, wherein said color identifier is opaque and further includes an opacifier.

8. The elongated communication transmission medium of claim 7, wherein said ultraviolet light cured coating composition of said color identifier has sufficient aromaticity to render its refractive index sufficiently high so that a mixture comprising said coating and said opacifier yields a white opaque liquid.

9. The elongated communication transmission medium of claim 8, wherein said substrate is optical fiber.

10. The elongated communication transmission medium of claim 8, wherein the refractive index of the opacifer is substantially less than the refractive index of the coating composition.

11. The elongated communication transmission medium of claim 10, wherein the opacifier comprises a perfluorinated polyether.

12. The elongated communication transmission medium of claim 11, wherein said substrate is an optical fiber which includes at least one layer of a coating material applied thereto and wherein said color identifier comprises a layer which has been applied to an outer surface of said at least one coating layer.

13. The elongated communication transmission medium of claim 12, wherein said color identifier includes about 98 parts by weight of an ultraviolet light cured composition, about 1 part by weight of an opacifier and about 2 parts of a polymeric dye, 14. The elongated communication transmission medium of claim 13, wherein said ultraviolet light cured composition comprises an oligomeric material.

15. The elongated communication transmission medium of claim 14, wherein said ultraviolet light cured coating composition comprises about 75 percent by weight of an oligomer, about 23 percent by weight of a diluent and about 2 percent by weight of a photoinitiator.

16. The elongated communication transmission medium of claim 15, wherein said ultraviolet light cured coating composition comprises about 75 percent by weight of an oligomer comprising polyethylene glycol adipate-toluene diisocyanate-hydroxyethyl acrylate, about 11.5 percent by weight of N-vinyl pyrolidone, about 11.5 percent by weight of ethoxyethoxyethyl acrylate and about 2 percent by weight of a photoinitiator.

17. The elongated communication transmission medium of claim 11, wherein said substrate is an optical fiber which is enclosed in a coating system, said coating system comprising an inner primary coating layer and an outer secondary coating layer.

18. The elongated communication transmission medium of claim 17, wherein said secondary coating layer includes a color identifier.

19. The elongated communication transmission medium of claim 18, wherein said ultraviolet light cured coating composition of said secondary coating layer comprises an oligomeric material.

20. The elongated communication transmission medium of claim 19, wherein said secondary coating layer comprises about 98 parts by weight of an oligomeric material, about 1 part by weight of an opacifier and about 2 parts by weight of a polymeric dye.

21. The elongated communication transmission medium of claim 20, wherein said oligomeric material comprises about 75 percent by weight of an oligomer, about 23 percent by weight of a diluent and about 2 percent by weight of a photoinitiator.

22. The elongated communication transmission medium of claim 21, wherein said ultraviolet light cured coating composition comprises about 75 percent by weight of an oligomer comprising polyethylene glycol adipate-toluene diisocyanate-hydroxyethyl acrylate, about 11.5 percent by weight of N-vinyl pyrolidone, about 11.5 percent by weight of ethoxyethoxyethyl arcylate and about 2 percent by weight of a photoinitiator.

23. The elongated communication transmission medium of claim 22, wherein the opacifier comprises a perfluorinated polyether.

* * * * *